United States Patent [19]
Bond

[11] 3,772,820
[45] Nov. 20, 1973

[54] BAIT STATION FOR SLUGS, SNAILS AND THE LIKE

[76] Inventor: Helen I. Bond, 1262 - 12th Ave., Longview, Wash.

[22] Filed: Mar. 20, 1972

[21] Appl. No.: 236,137

[52] U.S. Cl. .............................................. 43/131
[51] Int. Cl. ........................................... A01m 1/20
[58] Field of Search ...................... 43/131, 121, 122

[56] References Cited
UNITED STATES PATENTS

| | | | |
|---|---|---|---|
| 3,427,743 | 2/1969 | Brunner et al. | 43/131 |
| 1,139,030 | 5/1915 | Goldhammer | 43/131 |
| 2,004,122 | 6/1935 | Loibl, Jr. | 43/131 |
| 1,573,278 | 2/1926 | Schlesinger | 43/131 |
| 1,007,931 | 11/1911 | Depner | 43/122 |
| 3,303,599 | 2/1967 | Ballard | 43/131 |

Primary Examiner—Warner H. Camp
Attorney—Eugene D. Farley

[57] ABSTRACT

A bait station particularly adapted for harboring poison bait for slugs, snails and the like comprises a central support post and a protective shield supported on the post and adapted to overlie a ground area having placed thereon a predetermined pattern of bait. Access openings are provided along the peripheral margin of the shield to afford access to the bait by the slugs and snails. A water reservoir associated with the station collects rain and sprinkler water and meters it to the bait in an optimum amount for activating the bait.

9 Claims, 3 Drawing Figures

PATENTED NOV 20 1973 3,772,820
FIG. 1
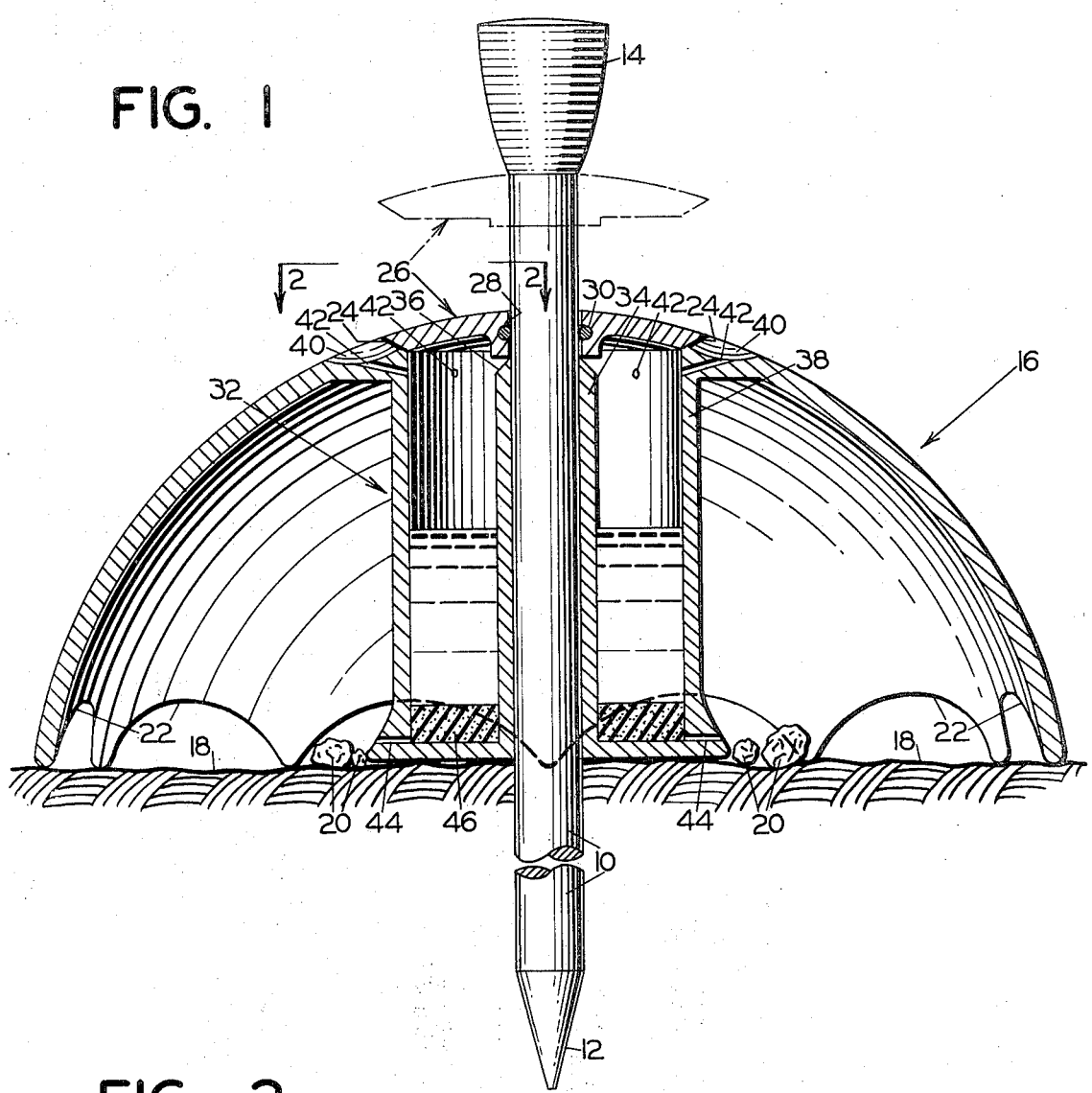
FIG. 2
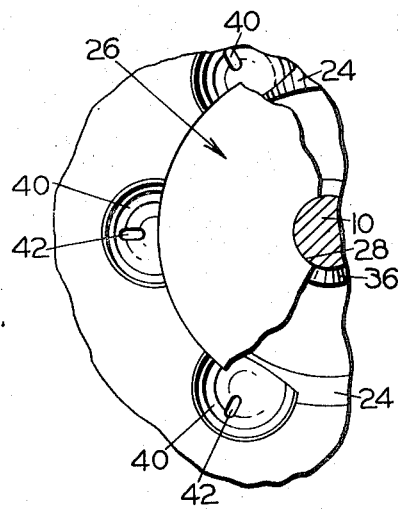
FIG. 3

BAIT STATION FOR SLUGS, SNAILS AND THE LIKE

This invention relates to bait stations for insects. It pertains particularly to a bait station serving the dual functions of presenting bait in a continuously active condition to slugs and snails while protecting the bait from inadvertent consumption by children and their pets.

In the control of slugs and snails by the use of poison bait, two basic problems are present.

First, since the bait is highly toxic, the bait should be made accessible to the slugs and snails but shielded from inadvertent consumption by children and their pets.

Second, most slug and snail baits contain formaldehyde as an active ingredient. For maximum efficiency, the formaldehyde must be exposed to water in critical amount. Enough moisture must be present to render the bait active. On the other hand, if too much water is present, it washes out the water-soluble formaldehyde and renders the bait useless.

It accordingly is the general purpose of the present invention to provide a bait station for insects, particularly slugs and snails, which makes the bait readily accessible to the insects but shields it from children and small animals.

It is a further object of the present invention to provide a bait station for slugs, snails and other insects which is provided with means for exposing the bait to water in the optimum amount for activating the bait without leaching the active principle therefrom.

Still another object of the invention is the provision of a bait station for slugs, snails and other creatures which is easily used, attractive in appearance, of moderate cost, and highly efficient in its operation.

The manner in which the foregoing and other objects of this invention are accomplished will be apparent from the accompanying specification and claims considered together with the drawings, wherein:

FIG. 1 is a sectional view of the herein described bait station, illustrated in its operative position;

FIG. 2 is a detail plan view of the bait station, looking in the direction of the arrows of line 2—2 of FIG. 1; and FIG. 3 is a fragmentary sectional view illustrating an alternate construction of the bait station.

The bait station of my invention is intended primarily as a station for presenting poisoned bait pellets to slugs and snails. However, in view of its design and manner of functioning, it may be employed broadly for presenting food or poison bait to be eaten selectively by small creatures while barring access to the food or bait to larger creatures.

In its broad concept, the bait station of my invention comprises a central support post mounting a shield or canopy. This shield is adapted to overlie a ground area having the food or bait placed thereon in a predetermined pattern. Peripheral openings are provided in the shield. These are sized to permit access by slugs or other small creatures while barring larger animals. A water reservoir is associated with the canopy and post. It is arranged in such a manner as to collect rain and sprinkler water and dispense it in metered amount to the ground area beneath the shield as required to activate the bait.

Considering the foregoing in greater detail and with particular reference to the drawings:

As is illustrated in FIG. 1, the bait station of my invention is mounted on a central post 10. This preferably is in the form of a stake having a pointed end 12 and a handle 14. The stake is of reasonably substantial construction, being, for example, 10 or 12 inches long and an inch or so in diameter. It is adapted to be inserted in the ground a sufficient distance to anchor the station securely against atmospheric disturbance as well as against displacement by inadvertent contact by persons or animals.

Post 10 mounts a shield or canopy, indicated generally at 16. This is a convexly cupped member preferably having an umbrella-like contour. It may be variously dimensioned, but in a typical situation it may be from 8 to 12 inches in diameter. It preferably is made integrally from molded plastic of various colors. The stations thus lend a decorative effect to the lawns and gardens in which they are used.

Shield 16 overlies a ground area 18 on which are placed a plurality of pellets 20 of the selected food or poison bait. Access to the pellets is afforded through one or more openings 22 in the peripheral margin of the shield. For convenience and decorative effect, these may be arranged to advantage as a scalloped margin.

Shield 16 has in its top an opening 24 sized to afford access to the interior. The opening is sealed by means of a removable cover 26. This has an opening 28 in its central portion, by means of which the cover is slidably mounted on post 10. An O-ring 30 is mounted in an annular recess in opening 28. It serves primarily as a frictional retainer, enabling shifting the cover between its full line closed position and its dotted line open position, and maintaining it secured in such positions as desired.

As outlined previously, it is a primary function of the presently described bait station to collect, store and dispense the water required to moisten bait pellets 20 and maintain them optimally effective.

To this end there is provided a reservoir, indicated generally at 32. This also may be formed of a single piece of cast or molded plastic which for convenience and economy of manufacture preferably is integrated with shield 16.

Reservoir 32 includes an inner wall 34 which is annular in outline and defines a central opening dimensioned for a sliding fit on post 10. It is the means by which the shield and reservoir are removably mounted on the post. The upper margin of wall 34 has a beveled edge 36 designed to guide rain and sprinkler water which may seep around the margin of cover 26 into the interior of the reservoir.

Reservoir 32 is further defined by an outer wall 38. This is arranged concentrically with and spaced outwardly from inner wall 34 a distance sufficient to provide a reservoir of the desired capacity.

Reservoir 32 is open at its top. It is filled with water either by removing cover 26 and filling it manually, or by means of sprinkler or rain water which falls in a natural manner on the top of the station and from time to time replenishes the supply of water in the reservoir.

To enable filling the reservoir in the latter manner, there are provided in the outer surface of shield 16 a plurality of recesses 40. These collect rain and sprinkler water. They also serve as finger openings by means of which cover 26 may be lifted up.

A downwardly sloping duct 42 interconnects each of finger recesses 40 with the interior of reservoir 32. The water collected in the reservoir is dispensed through a plurality of small ducts 44 located at the extreme bottom of the reservoir and extending radially outwardly. These in effect are tiny capillaries which transmit a small amount of water to bait pellets 20, either directly or by moistening the ground on which the pellets rest. It will be noted that the bases of outer wall 38 of the reservoir preferably are thickened with a flange to assist in accomplishing this function.

Further to assist in dispensing the water in metered flow through ducts 44, there is seated in the bottom of reservoir 32 a cellular member or sponge 46. This partially seals off ducts 44 and materially restricts the flow of water therethrough to a minute amount sufficient to moisten the soil and the bait pellets, but insufficient to waste the water and leach out the active principals from the pellets.

An alternative means of accomplishing this function is illustrated in FIG. 3. In this form of the invention, a wick 48 is pressed into each of ducts 44. It is sufficiently long to extend to the pelletized area of the ground and through capillary action dispenses water thereto.

The manner of use of the herein described bait station is evident from the foregoing.

The station is located in a garden or lawn area where slugs and snails are prevalent. The pellets are placed on the ground in the predetermined pattern. Stake 10 is inserted through the central opening of reservoir 32 and cover 26. It then is inserted in the ground in such a manner as to cover the pellets with shield 16. The margins of the shield are either pressed against the ground or closely spaced therefrom. Openings 22 in the margins provide access to the slugs, snails or other insects. Children and small animals, however, are prevented from reaching the poison pellets.

Reservoir 32 may be filled with water manually upon lifting cover 26. In the alternative or additionally, it is filled from time to time with sprinkler or rain water. Such water is collected in recesses 40 and travels through sloping ducts 42 into the reservoir.

The accumulated water is dispensed in valved or metered flow through dispensing ducts 44 at the bottom of the reservoir. The flow is controlled in the FIG. 1 embodiment by sponges 46 and in the FIG. 3 embodiment by wicks 48. In either case, moisture is transferred to the ground in amount sufficient to moisten pellets 20 and keep them in their optimum state of activity without leaching formaldehyde or other active principles from them.

Having thus described my invention in preferred embodiments, I claim:

1. A bait station for slugs, snails and the like, comprising:
   a. a protective hollow shield having an irregular peripheral margin facing the ground and providing openings therebetween large enough to pass slugs, snails and other insects attracted by bait placed on the ground area underlying the shield, and
   b. a water reservoir secured to the shield and extending downward centrally within the shield, the reservoir having water outlet passageway means therethrough adjacent its lower end for dispensing water therefrom in metered amount sufficient to activate the bait but insufficient to destroy its effectiveness,
   c. the shield having water inlet passageway means therethrough communicating with the reservoir for filling water into the latter.

2. The bait station of claim 1 including water absorbent material intercepting the outlet passageway means in the reservoir for metering the water therefrom.

3. The bait station of claim 1 including water trap means in the shield communicating with the inlet passageway means for trapping rain and sprinkler water for filling into the reservoir through the inlet passageway means.

4. The bait station of claim 1 wherein the shield includes an upper central cover section displaceable from the surrounding portion of the shield and removably covering the reservoir.

5. The bait station of claim 1 including a central post extending downward from the reservoir for penetration into the ground.

6. The bait station of claim 5 wherein the central post extends upward removably through the center of the shield and reservoir, and sealing means is interposed between the reservoir and post.

7. The bait station of claim 5 wherein the shield includes an upper central cover section displaceable from the surrounding portion of the shield and removably covering the reservoir, the central post extending upward through the displaceable central cover section of the shield for relative displacement thereof, and friction means interengages said post and central cover section for frictionally resisting said relative displacement, for adjusting the central cover section between open and closed positions.

8. The bait station of claim 1 wherein
   a. a central post extends through the center of the shield and reservoir downward from the reservoir for penetration into the ground and upward from the shield, and sealing means is interposed between the reservoir and post,
   b. the shield includes an upper central cover section displaceable from the surrounding portion of the shield and removably covering the reservoir, the central post extending upward through the displaceable central cover section of the shield for relative displacement thereof, and friction means interengages said post and central cover section for frictionally resisting said relative displacement, for adjusting the central cover section between open and closed positions,
   c. water trap means in the shield communicates with the inlet passageway means for trapping rain and sprinkler water for filling into the reservoir through the inlet passageway means, and
   d. water absorbent material intercepts the outlet passageway means in the reservoir for metering the water from the latter.

9. A bait station for slugs, snails and the like, comprising:
   a. central support post means,
   b. a protective shield supported on the post means,
   c. the shield when supported by the post means being adapted to overlie a ground area having placed thereon a predetermined pattern of bait,
   d. at least some segments of the peripheral margin of the shield being spaced from the ground sufficiently to permit entrance and egress of slugs, snails and other insects attracted by the bait, e. a centrally located water reservoir means having an upper opening for filling with water and lower drain openings for dispensing the water in metered amounts sufficient to activate the bait but insufficient to destroy its effectiveness, and f. water trap means in the top of the shield designed to trap rain and sprinkler water, and duct means interconnecting the trap means and reservoir means.

* * * * *